United States Patent
Greenwood

(10) Patent No.: US 8,886,938 B1
(45) Date of Patent: Nov. 11, 2014

(54) SYSTEM AND METHOD FOR CROSS-SITE REFERENCE FORGERY ATTACK PREVENTION USING DOUBLE VALIDATED TOKENS WITH TIME SENSITIVITY

(71) Applicant: Matthew Greenwood, Plymouth, MA (US)

(72) Inventor: Matthew Greenwood, Plymouth, MA (US)

(73) Assignee: Intuit Inc., Mountain View, CA (US)

( * ) Notice: Subject to any disclaimer, the term of this patent is extended or adjusted under 35 U.S.C. 154(b) by 146 days.

(21) Appl. No.: 13/731,877

(22) Filed: Dec. 31, 2012

(51) Int. Cl.
*G06F 21/00* (2013.01)
*H04L 9/32* (2006.01)

(52) U.S. Cl.
CPC .................. *H04L 9/3236* (2013.01)
USPC ........... 713/168; 713/150; 713/151; 713/170; 726/2; 726/3; 726/4; 726/5; 726/9; 726/14; 726/16; 726/17; 726/20; 726/21; 726/26; 726/27; 726/28; 726/29

(58) Field of Classification Search
CPC ......... H04L 67/02; H04L 63/08; H04L 63/10; H04L 63/1441; H04L 63/1446; G06F 17/30861; G06F 17/3089; G06F 21/00; G06F 21/604; G06F 21/6263
USPC ........ 713/150, 151, 168, 170; 726/2–5, 9, 14, 726/16, 17, 20, 21, 26–29
See application file for complete search history.

(56) References Cited

U.S. PATENT DOCUMENTS

2009/0192944 A1\* 7/2009 Sidman et al. ................. 705/75

FOREIGN PATENT DOCUMENTS

JP          2013134655 A   \*   7/2013

\* cited by examiner

*Primary Examiner* — Joseph P. Hirl
*Assistant Examiner* — Kalish Bell
(74) *Attorney, Agent, or Firm* — Osha Liang LLP

(57) ABSTRACT

A method and system for validating a form, that includes providing, to a client, the form comprising a primary token, receiving, in response to the client loading the page form, a request for a secondary token, providing the secondary token in response to receiving the request, and receiving the form comprising the primary token and a secondary token from a client. The method further includes validating the form, where validating the form includes obtaining a first primary token hash from the secondary token, applying a first hash function to the primary token to obtain a second primary token hash, and determining that the first primary token hash and the second primary token hash match. The method further includes accepting the form upon validating the form.

18 Claims, 11 Drawing Sheets

SYSTEM AND METHOD FOR CROSS-SITE REFERENCE FORGERY ATTACK PREVENTION USING DOUBLE VALIDATED TOKENS WITH TIME SENSITIVITY

BACKGROUND

Customers store and access sensitive information over the Internet with increasing frequency. Despite the increasing strength of security protocols used by customers to access this data, certain security vulnerabilities are still subject to exploitation. One more common type of attack is cross-site reference forgery (CSRF) in which a customer inadvertently initiates an unintended transaction on the secure host by interacting with content (such as a link) hosted by a third-party attacker. Businesses and customers would benefit from further protection against such attacks.

SUMMARY

In general, in one aspect, the invention relates to a method for validating a form. The method includes providing, to a client, the form comprising a primary token, receiving, in response to the client loading the page form, a request for a secondary token, providing the secondary token in response to receiving the request, and receiving the form comprising the primary token and a secondary token from a client. The method further includes validating the form, where validating the form includes obtaining a first primary token hash from the secondary token, applying a first hash function to the primary token to obtain a second primary token hash, and determining that the first primary token hash and the second primary token hash match. The method further includes accepting the form upon validating the form.

In general, in one aspect, the invention relates to a system. The system includes a computer processor, memory, and a server program stored in the memory and executing on the computer processor. The server program has functionality to provide, to a client the form comprising a primary token, receive, in response to the client loading the page form, a request for a secondary token, provide the secondary token in response to receiving the request, and receive a form comprising a primary token and a secondary token from a client. The server program further includes functionality to validate the form, where the form is validated by obtaining a first primary token hash from the secondary token, applying a first hash function to the primary token to obtain a second primary token hash, and determining that the first hash function and the second hash function match. The server program further includes functionality to accept the form upon determining the form is validated.

In general, in one aspect, the invention relates to a computer readable storage medium with instructions that, when executed by a processor, comprise functionality to perform steps for validating a form. The steps include providing, to a client, the form comprising a primary token, receiving, in response to the client loading the page form, a request for a secondary token, providing the secondary token in response to receiving the request, and receiving the form comprising the primary token and a secondary token from a client. The steps further include validating the form, where validating the form includes obtaining a first primary token hash from the secondary token, applying a first hash function to the primary token to obtain a second primary token hash, and determining that the first primary token hash and the second primary token hash match. The steps further include accepting the form upon validating the form.

Other aspects of the invention will be apparent from the following description and the appended claims.

DETAILED DESCRIPTION

Figure 1:
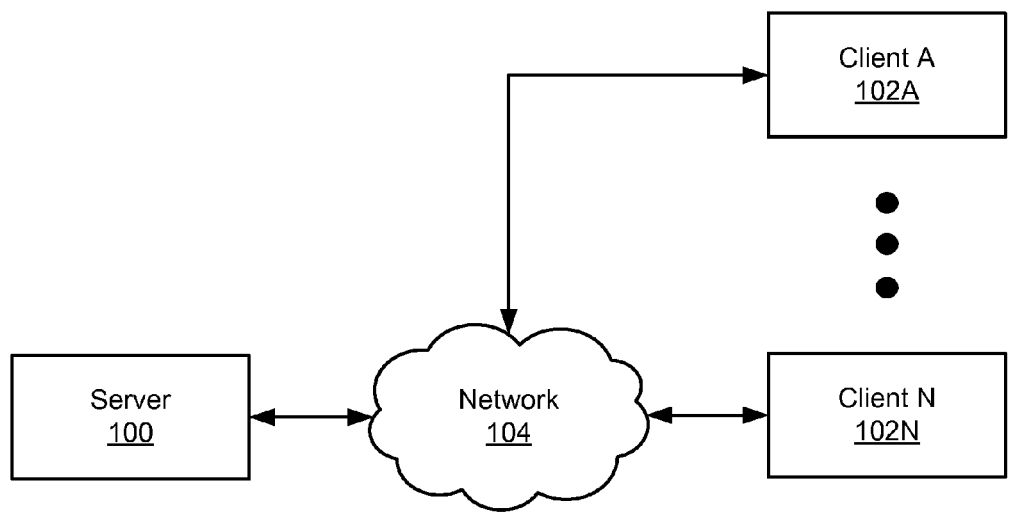
FIGS. 1-5 show a flow diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for an enhanced mechanism for guarding against CSRF-type attacks. Specifically, embodiments of the invention may be used to validate a transaction using a pair of enhanced tokens that may be used to validate each other.

FIG. 1 shows a diagram of a system in accordance with one or more embodiments of the invention. As shown in FIG. 1, the server (100) is connected to one or more clients (client A (102A), client N (102N)) via a network (104).

In one or more embodiments of the invention, the server (100) is a computer system or group of computer systems with functionality to service requests from one or more clients (client A (102A), client N (102N)). Such requests may include requests for data and files, such as webpages. Further, such requests may include validation data used to verify that the client is authorized to receive the results of a request. Detail about the server (100) is shown and described in relation to FIG. 2.

In one or more embodiments of the invention, the one or more clients (client A (102A), client N (102N)) are computer systems or groups of computer systems with functionality to generate requests to be serviced by the server (100). The one or more clients (client A (102A), client N (102N)) may be implemented as a personal computer or computing device operated by a user, and sending requests based on input from the user. Detail about the one or more clients (client A (102A), client N (102N)) is shown and described in relation to FIG. 2.

Figure 2:
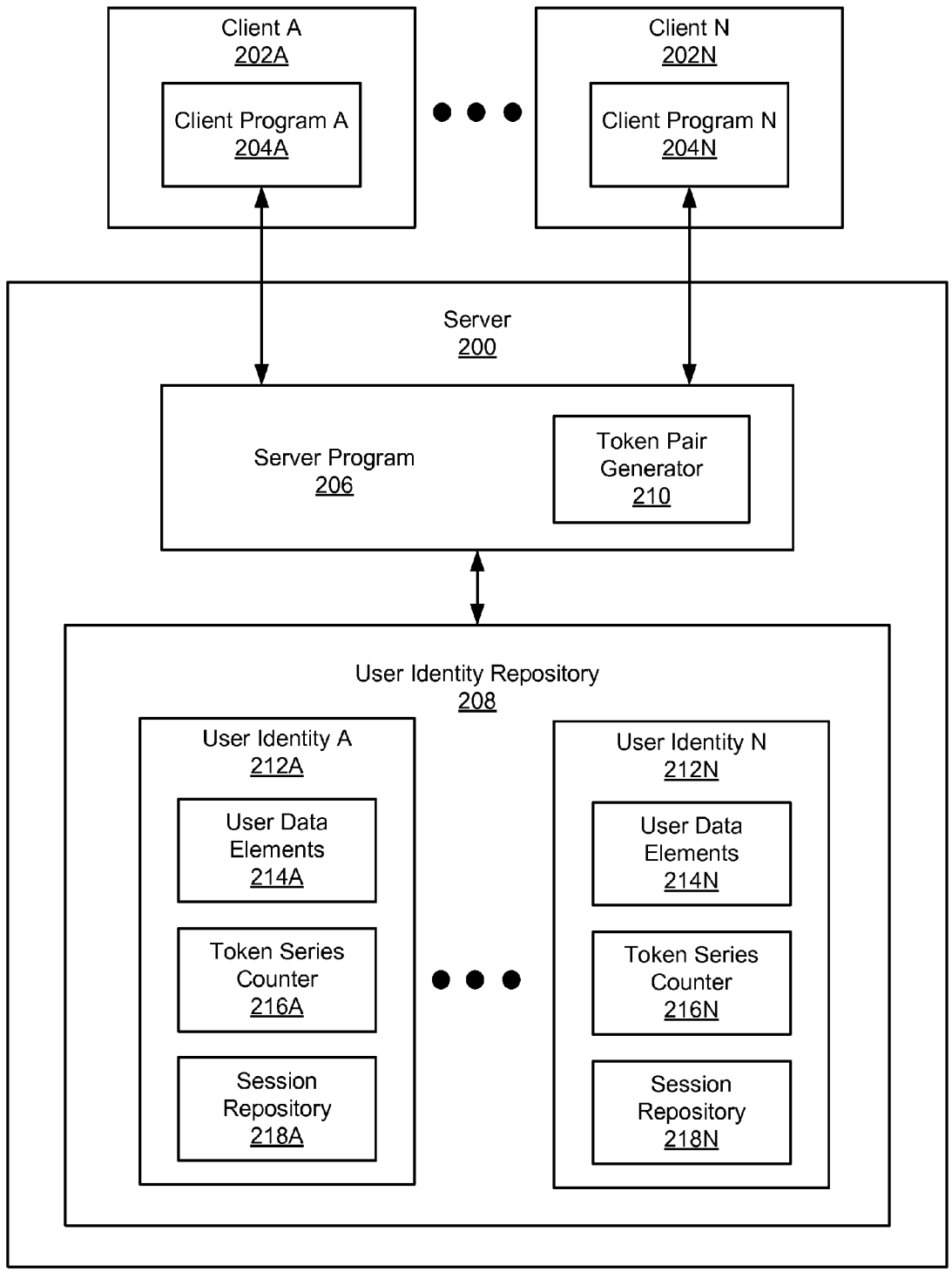

FIG. 2 shows a diagram of a system in accordance with one or more embodiments of the invention. As shown in FIG. 2, a server (200) is connected to one or more clients (client A (202A), client N (202N)). Each client (client A (202A), client N (202N)), includes a client program (client program A (204A), client program N (204N)). The server (200) includes a server program (206) and a user identity repository (208). The server program (206) includes a token pair generator (210). The user identity repository (208) includes multiple user identities (user identity A (212A), user identity N (212N)). Each user identity (user identity A (212A), user identity N (212N)) includes user data elements (user data elements A (214A), user data elements N (214N)), a token series counter (token series counter A (216A), token series counter N (216N)), and a session repository (session repository A (218A), session repository N (218N)).

In one or more embodiments of the invention, the server program (206) is a process or group of processes with functionality to communicate with client programs (client program A (204A), client program N (204N)). In one embodiment of the invention, the server program (206) provides data files to client programs (client program A (204A), client program N (204N)) that are rendered on the client (client A (202A), client N (202N))) and displayed to a user and includes functionality to receive input from the user. In one embodiment of the invention, server program (206) is part of a web server with functionality to host an application that contains sensitive data.

In one or more embodiments of the invention, a client program (client program A (204A), client program N (204N)) is a process or group of processes with functionality to translate input from a user of the client (client A (202A), client N (202N)) into a request transmitted to the server program (206). In one embodiment of the invention, the client program (client program A (204A), client program N (204N)) includes functionality to receive data from the server program (206) and output the data to a user of the client (client A (202A), client N (202N). In one embodiment of the invention, the client program (client program A (204A), client program N (204N)) includes a web browser.

In one or more embodiments of the invention, the server program (206) may be implemented as part of a financial services application, accessible using the client program (client program A (204A), client program N (204N)). In one embodiment of the invention, a financial services application may be used by a user of a client (client A (202A), client N (202N)) to manage financial transactions. Such management functionality may include, but is not limited to, tracking deposits to and payments from a bank account, managing credit, handling payroll, and accessing retirement funds and accounts.

In one or more embodiments of the invention, the server program (206) includes a token pair generator (210) with functionality to generate a data set used to validate a client program (client program A (204A), client program N (204N)). Specifically, the token pair generator (210) includes functionality to generate a pair of tokens using data from a user identity. In one embodiment of the invention, a token is data (such as a string of text) that enables a server program (206) and a client program (client program A (204A), client program N (204N)) to identify one another. Further detail regarding tokens is shown and described in relation to FIGS. 4 and 5.

In one or more embodiments of the invention, the user identity repository is a collection of user identities (user identity A (212A), user identity N (212N)) used by the server program (206) to store and retrieve data associated with different users accessing the server (200) via a client program (client program A (204A), client program N (204N)).

In one or more embodiments of the invention, the user data elements (user data elements A (214A), user data elements N (214N)) in each user identity (user identity A (212A), user identity N (212N)) include information identifying a user. Such information may include, for example, a unique identification number, a user realm identifying the user by index to a table, and date the user account was created. The user data elements (user data elements A (214A), user data elements N (214N)) may include other data items not listed above.

In one or more embodiments of the invention, the token series counter (token series counter A (216A), token series counter N (216N)) is data that tracks the most recently issued series number for a pair of tokens. In one embodiment of the invention, token pairs generated by the token pair generator (210) each include a token series number obtained from the token series counter (216). Further, the token series counter (216) is used to verify that a token submitted by a client program (client program A (204A), client program N (204N)) was part of the most recently issued token pair for a user. In one embodiment of the invention, a token received with an outdated token series number may indicate that the token is not valid.

In one or more embodiments of the invention, the session repository (session repository A (218A), session repository N (218N)) is a collection of sessions containing data about transactions between the server program (206) and a client program (client program A (204A), client program N (204N)), organized by related requests. Detail about the session repository (session repository A (218A), session repository N (218N)) is shown and described in relation to FIG. 3.

Figure 3:
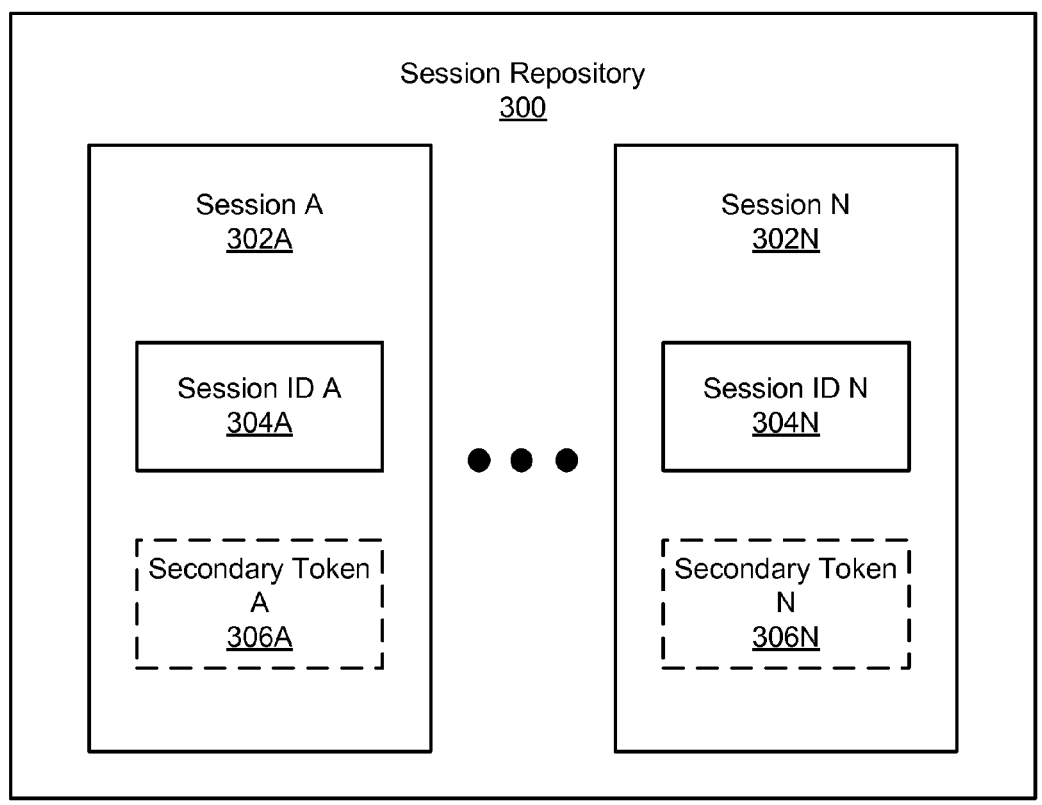

FIG. 3 shows a diagram of a session repository in accordance with one or more embodiments of the invention. As shown in FIG. 3, the session repository (300) includes multiple sessions (session A (302A), session N (302N)). Each session (session A (302A), session N (302N)) includes a session ID (session ID A (304A), session ID N (304N)) and may include, at various times, a secondary token (secondary token A (306A), secondary token N (306N)).

In one or more embodiments of the invention, the session ID (session ID A (304A), session ID N (304N)) is a unique identifier assigned at the initialization of a transaction and applied to subsequent related transactions. For example, a user may initialize a session by requesting a form. The server program creates a session (session A (302A), session N (302N)) with a unique session ID (session ID A (304A), session ID N (304N)), and embeds the session ID into the requested form. The user may then subsequently populate the form and submit the populated form with the session ID to the server program, which subsequently associates the submitted populated form with the initial request for the form.

In one or more embodiments of the invention, the server program stores a secondary token (secondary token A (306A), secondary token N (306N)) in the session (session A (302A), session N (302N)) for later retrieval. Further detail about the secondary token (secondary token A (306A), secondary token N (306N)) is shown and described in relation to FIG. 5.

Figure 4:
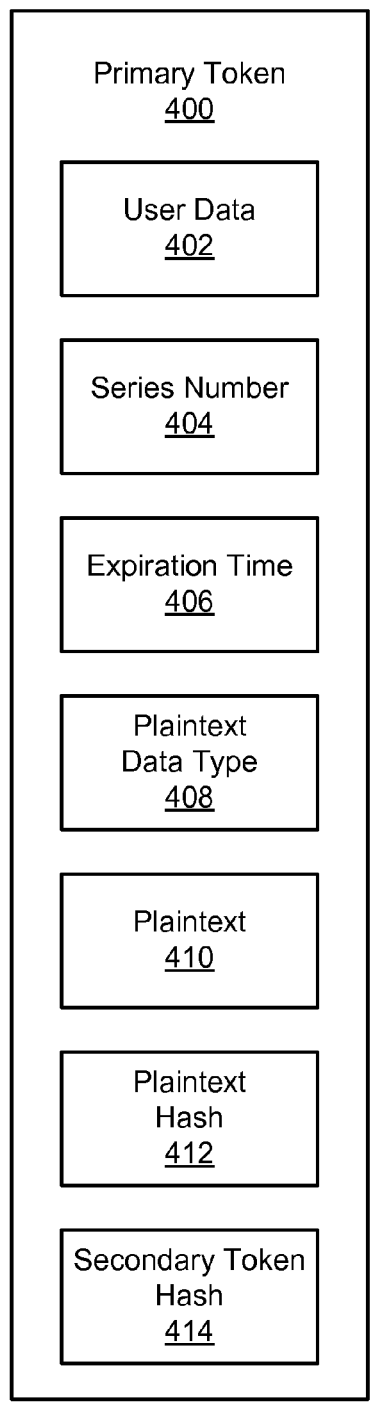

FIG. 4 shows a diagram of a primary token in accordance with one embodiment of the invention. As shown in FIG. 4, the primary token (400) includes user data (402), a series number (404), an expiration time (406), a plaintext data type (408), plaintext (410), a plaintext hash (412), and a secondary token hash (414).

In one or more embodiments of the invention, the user data (402) includes identifying information used to locate a user identity. In one embodiment of the invention, the user data (402) identifies a user identity against which the other data in the token is compared.

In one or more embodiments of the invention, the series number (404) is the value of the token series counter when the token pair is generated. In one embodiment of the invention, the series number (404) is implemented as an integer representing the total number of tokens generated for a user identity. Alternatively, in one embodiment of the invention, the series number (404) is implemented as a value representing the time at which the primary token (400) was generated.

In one or more embodiments of the invention, the expiration time (406) is a value identifying a point in time subsequent to the generation of the primary token (400). Specifically, in one embodiment of the invention, the expiration time (406) is the point at which the primary token (400) is no longer acceptable to validate a user submission.

In one or more embodiments of the invention, the plaintext data type (408) is data that indicates the content and order of the text stored as the plaintext (410). In one or more embodiments of the invention, the plaintext (410) is a set or subset of user data elements stored in the user identity for the user associated with the primary token (400). For example, suppose that a user identity has data elements name=A, uniqueID=9, and datecreated=10-15-2008. Using these data elements, the plaintext data type (408) may be [uniqueID][datecreated][name], and the plaintext (410) would therefore be [9][10-15-2008][9]. In one embodiment of the invention, the plaintext is unencrypted (i.e., comprehensible without decoding).

In one or more embodiments of the invention, the plaintext hash (412) is the result of applying a hash function to the plaintext (410). In one embodiment of the invention, the server program can apply a stored hash function to plaintext within a primary token (400) received from a client program and compare the result to the plaintext hash (412) stored in the primary token (400). In one embodiment of the invention, the plaintext hash (412) provides the server program with the ability to verify that the plaintext (410) was generated by an entity with access to the same hash function used to generate the plaintext hash (412).

In one or more embodiments of the invention, the secondary token hash (414) is the result of applying a hash function to a secondary token or a portion of a secondary token. In one embodiment of the invention, the secondary token hash (414) is used to verify that a secondary token is validly paired with a primary token (400). Specifically, in one embodiment of the invention, the server program can apply a stored hash function to a secondary token paired with a primary token (400) and received from a client program. The result of applying the hash function to the secondary token may then be compared to the secondary token hash (414) stored in the primary token (400). In one embodiment of the invention, the secondary token hash (414) provides the server program with the ability to verify that the received secondary token is validly paired with the primary token (400).

Figure 5:
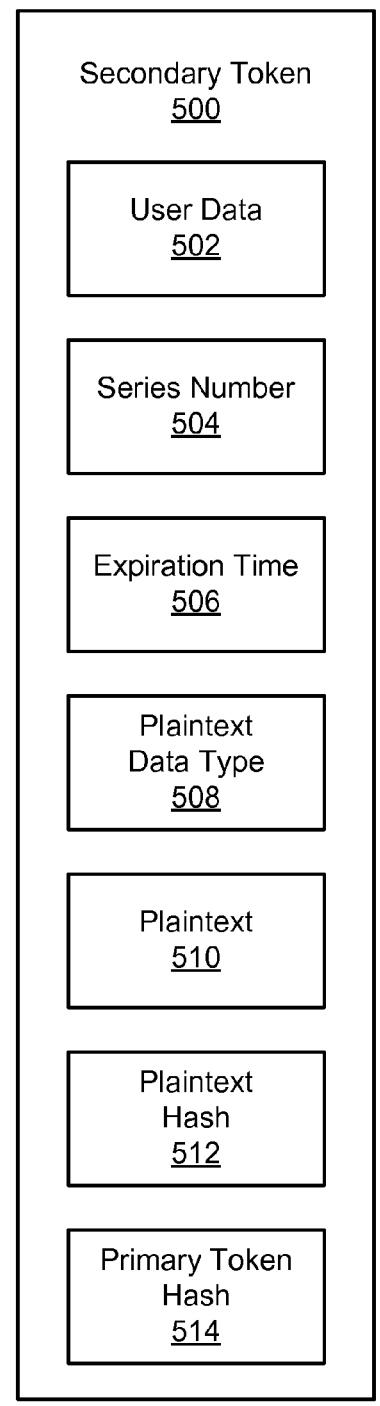

FIG. 5 shows a diagram of a secondary token in accordance with one embodiment of the invention. As shown in FIG. 5, the secondary token (500) includes user data (502), a series number (504), an expiration time (506), a plaintext data type (508), plaintext (510), a plaintext hash (512), and a primary token hash (414).

In one or more embodiments of the invention, the user data (502), series number (504), expiration time (506) plaintext data type (508), plaintext (510), and plaintext hash (512) are substantially similar to the equivalent elements depicted in FIG. 4. However, for any given primary token and secondary token pair, the data contained in one or more elements may be different.

In one or more embodiments of the invention, the plaintext data type (508) of the secondary token (500) is different from the plaintext data type of the paired primary token. In one embodiment of the invention, the plaintext (510) of the secondary token (500) may also be different from the plaintext of the paired primary token, and therefore results in a different plaintext hash (512). In one embodiment of the invention, the variation of the plaintext between a token pair prevents a token forger from simply copying the plaintext data type (508) plaintext (510) and plaintext hash (512) from one token of the pair to generate the paired token.

In one or more embodiments of the invention, the primary token hash (514) is the result of applying a hash function to a primary token or a portion of a primary token. In one embodiment of the invention, the primary token hash (514) is used to verify that a primary token is validly paired with a secondary token (500). Specifically, in one embodiment of the invention, the server program can apply a stored hash function to a primary token paired with a secondary token (500) and received from a client program. The result of applying the hash function to the primary token may then be compared to the primary token hash (514) stored in the secondary token (500). In one embodiment of the invention, the primary token hash (514) provides the server program with the ability to verify that the received primary token is validly paired with the secondary token (500).

In one or more embodiments of the invention, the primary tokens and secondary tokens are sent via different protocols. For example, the primary token may be sent in a transfer using hypertext transfer protocol (HTTP) and or HTTP secure (HTTPS). The secondary token may therefore be sent, for example, using asynchronous JavaScript and extensible markup language (AJAX). Further, the primary token may, for example, be designated HTTP-only, and therefore inaccessible using other protocols (such as AJAX). In one embodiment of the invention, the primary tokens and secondary tokens are sent via different protocols in order to prevent a foreign client-side program (i.e., a program downloaded and executed inadvertently by a user) from being able to read both tokens.

Figure 6:
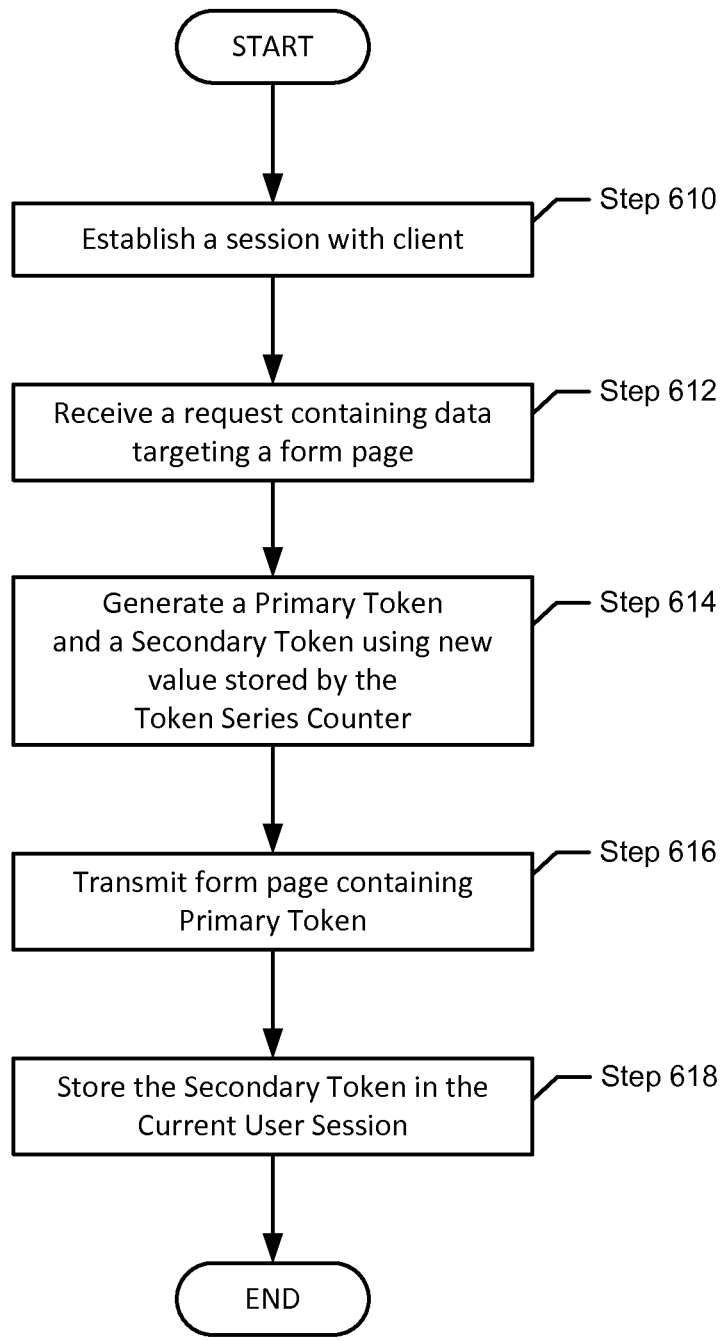
FIGS. 6-9 show a flow chart of a method in accordance with one or more embodiments of the invention.

FIG. 6 shows a flowchart for receiving an initial request for a form in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel.

In Step 610, the server establishes a session with the client. In Step 612, the server program receives a request containing data targeting a form page. In one embodiment of the invention, the request containing the data is sent during an active session, and includes a session ID. Also in Step 612, the server program accesses the user identity and session associated with the session ID. In Step 614, the server program generates a primary and secondary token using the new value stored by the token series counter. In one embodiment of the invention, the token pair is generated using information from the user identity. Further, elements of the token pair may be generated by applying a hash function to certain portions of data stored in the user data elements.

In Step 616, the server program generates the requested form page using the primary token of the token pair, and transmits the form page to the client program. In one embodiment of the invention, the primary token is sent as a HTTPS HTTP-only cookie. In one embodiment of the invention, the form page includes functionality to automatically generate a request for the secondary token once the form page is loaded by the client program. In Step 618, the secondary token is stored in the user identity within the current session (the session matching the received session ID.

Figure 7:
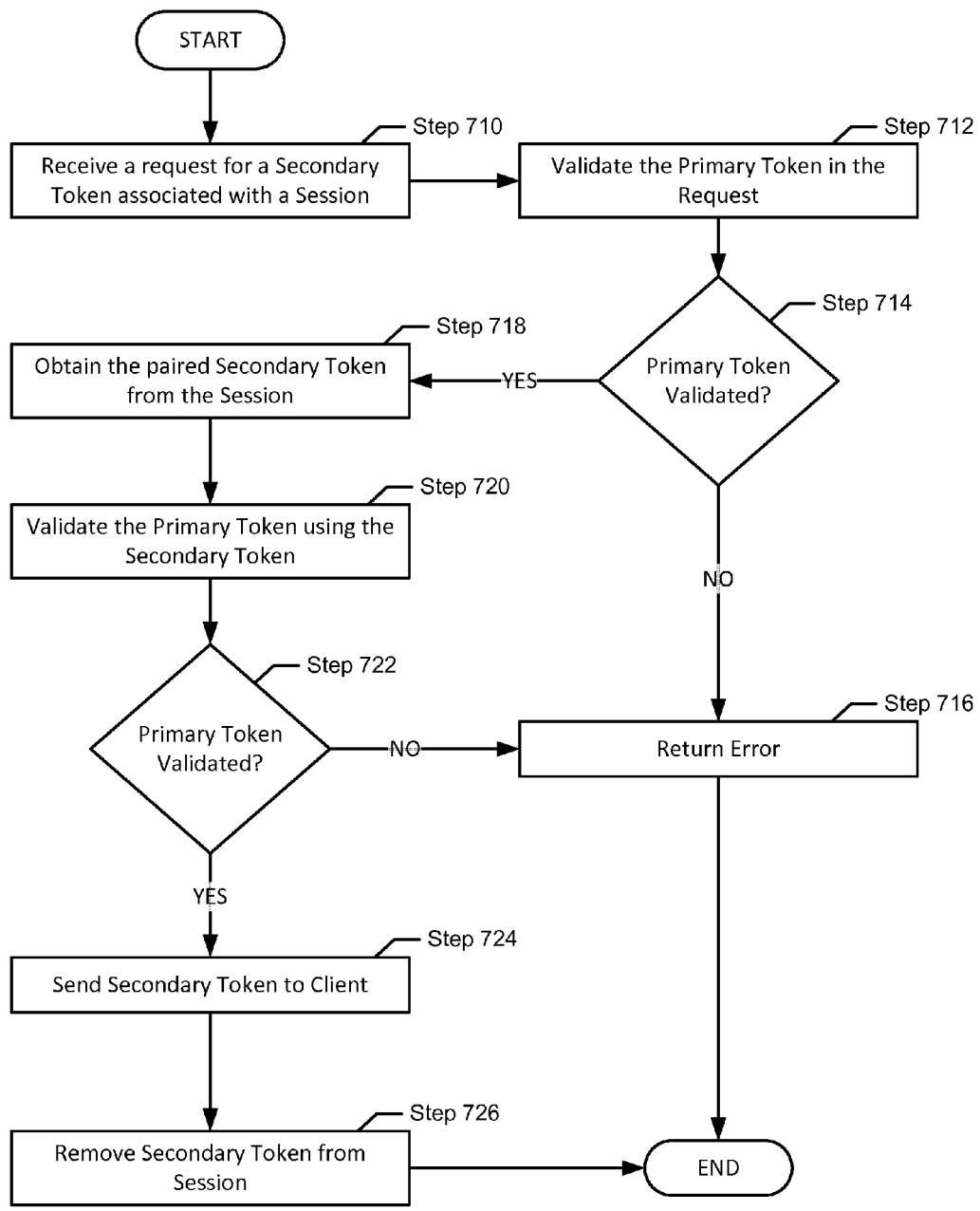

FIG. 7 shows a flowchart for servicing the request for the secondary token in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel.

In Step 710, the server program receives a request for a secondary token associated with a session. In one embodiment of the invention, the request includes a session ID referencing a session stored in a user identity. In one embodiment of the invention, the request is sent using an AJAX call initiated when a client program loads an HTTP form containing an HTTPS HTTP-only primary token. In one embodiment of the invention, the request is sent automatically from the client at the time the page form is loaded by the client program and without any further input from a user of the client program.

In Step 712, the received primary token is validated. In one embodiment of the invention, the primary token may be validated using multiple comparisons. In one embodiment of the invention, the server program uses the plaintext data type in the primary token and the user data elements stored in the user identity to generate plaintext for the user. The generated plaintext may then be compared to the plaintext portion of the received primary token. In one embodiment of the invention, the primary token may be validated by applying a stored hash function to the generated plaintext and comparing the result to the plaintext hash within the received primary token. In one embodiment of the invention, the primary token may be validated by comparing the expiration time in the primary token to the current time stored on the server. In one embodiment of the invention, the primary token is validated by comparing the series number stored in the primary token to the current value of the token series counter stored in the user identity. Further information on token validation is shown and described in relation to FIG. 9.

In Step 714, the server program determines whether the primary token was validated (i.e., shown to be valid). If in Step 714, the server program determines that the primary token is not valid, then in Step 716, the server program responds to the request by notifying the sender of the request that an invalid primary token has been submitted. If in Step 714, the server program determines that the primary token is valid, then in Step 718, the server program obtains the pair secondary token from the session stored in the user identity. In Step 720, the server program validates the primary token using the secondary token. In one embodiment of the invention, the primary token is validated using the primary token hash stored in the secondary token. In one embodiment of the invention, the server program applies a stored hash function to the primary token and compares the result to the primary token hash in the secondary token.

In Step 722, the server program determines whether the primary token is valid based on the validation performed using the secondary token. If in Step 722, the server program determines that the primary token is not valid, then in Step 716, the server program responds to the request by notifying the sender of the request that they have submitted an invalid primary token. If in Step 722, the server program determines that the primary token is valid, then in Step 724, the server program sends the secondary token to the client. In one embodiment of the invention, the secondary token is sent via java script object notation. In Step 726, the server program removes the secondary token from the session within the user identity.

Figure 8:
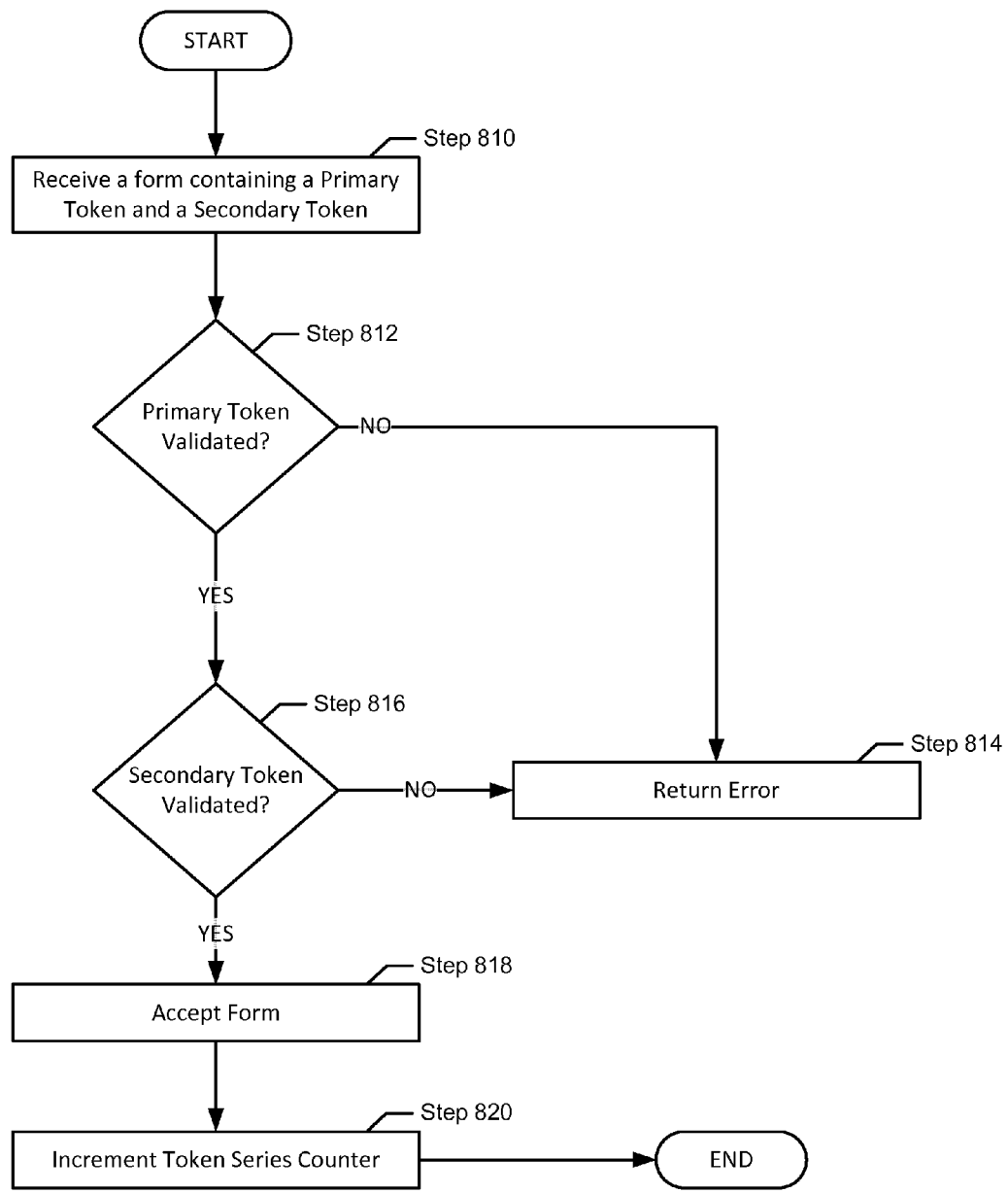

FIG. 8 shows a flowchart for validating the token pair upon receiving a form in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel.

In Step 810, the server program receives a form containing a primary token and a secondary token. In Step 812, the server program determines whether the primary token is valid. In one embodiment of the invention, the primary token is validated in the same manner as the validation performed on the primary token discussed in FIG. 7. If in Step 814, the server program determines that the primary token is not valid, then in Step 816, the server program responds to the request by notifying the sender of the request that they have submitted an invalid primary token.

If in Step 812, the server program determines that the primary token is valid, then in Step 816, the server program determines whether the secondary token is valid. In one embodiment of the invention, the secondary token is validated in the same manner as the primary token. If in Step 816, the server program determines that the secondary token is not valid, then in Step 816, the server program responds to the request by notifying the sender of the request that they have submitted an invalid primary token. If in Step 816, the server program determines that the secondary token is valid, then in Step 818, the form is accepted. Once the form is accepted, then in Step 820, the token series counter value is incremented.

Figure 9:
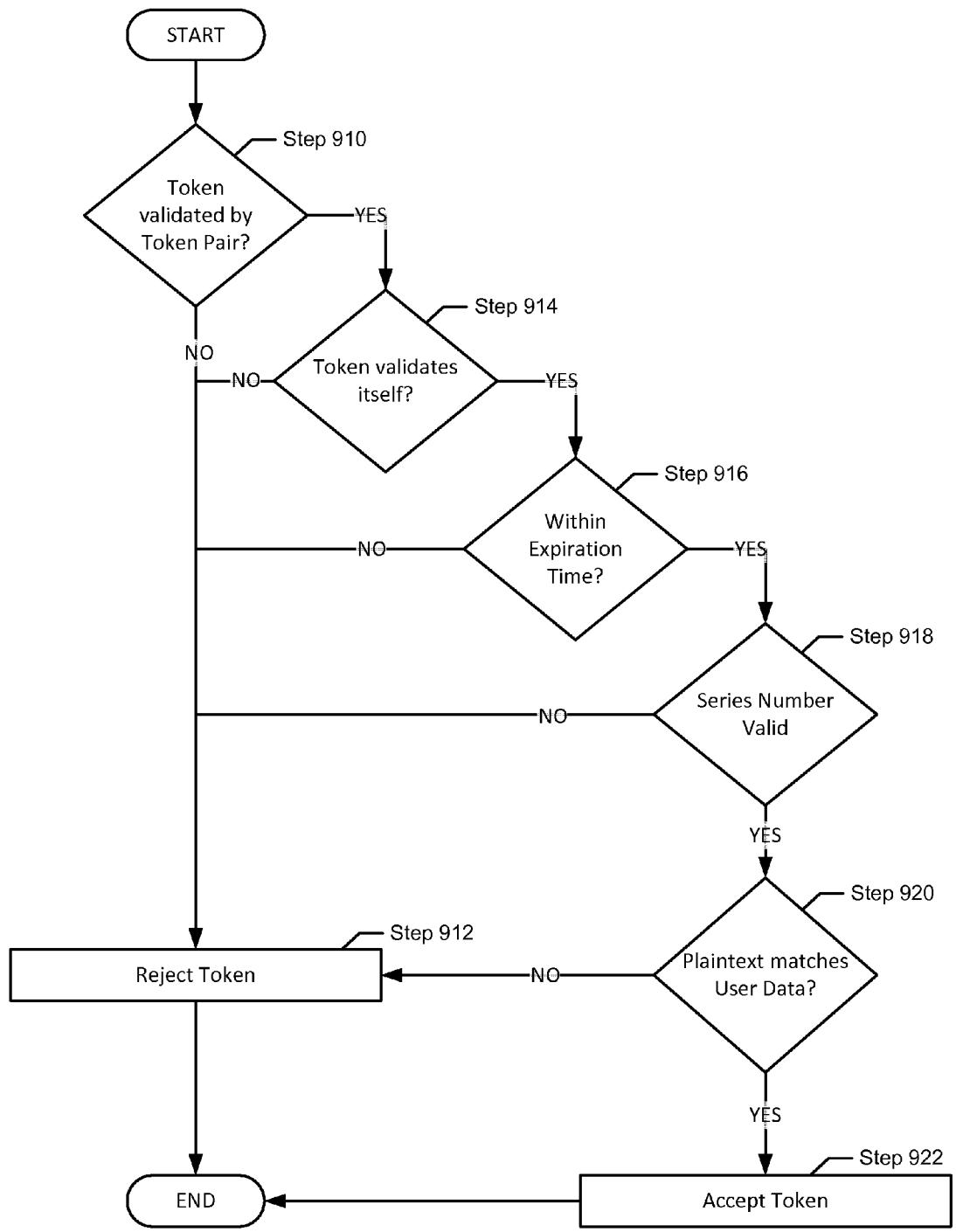

FIG. 9 shows a flowchart for validating each token in a token pair in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel.

In Step 910, the token is validated using the token hash stored in the paired token. In one embodiment of the invention, the server program applies a stored hash function to the token and compares the result to the token hash in the paired token. In one embodiment of the invention, the server program generates a hash function for use by all user identities. In one embodiment of the invention, the server program generates a different hash function for each user identity to be used for tokens generated for that user identity.

If in Step 910, the token hash of the received token does not match the token hash stored in the paired token, then in Step 912, the server program determines that the token is invalid (i.e., not valid).

In Step 914, the server program applies a hash function to the plaintext in the token, and compares the result to the plaintext hash stored in the token. In one embodiment of the invention, the hash function applied to the plaintext is generated by the server program for the user identity. In one embodiment of the invention, the hash function is generated by the server program for use by multiple user identities. If in Step 914, the resulting plaintext hash does not match the plaintext hash stored in the token, then in Step 912, the server program determines that the token is invalid (i.e., not valid).

In Step 916, the server program obtains the expiration time stored in the token and compares it to a current time. In one embodiment of the invention, the current time is obtained from the system clock. If in Step 916, the expiration time is before the current time, then in Step 912, the server program determines that the token is invalid (i.e., not valid).

In Step 918, the server program obtains the series number stored in the token, and compares it to the value of the token series counter stored in the session associated with the token. If in Step 918, the series token number does not match the value stored in the token series counter, then in Step 912, the server program determines that the token is invalid (i.e., not valid).

In Step 920, the server program determines whether the plaintext stored in the token matches the plaintext in the user identity for the associated session. In one embodiment of the invention, the server program parses the plaintext using the plaintext data type stored in the token. If in Step 920, one or more of the element in the plaintext of the token does not match the user data elements stored in the user identity, then in Step 912, the server program determines that the token is invalid (i.e., not valid). If in Step 920, the server program determines that the plaintext stored in the token matches the user data elements stored in the user identity, then in Step 922, the token is accepted as valid.

Figure 10A:
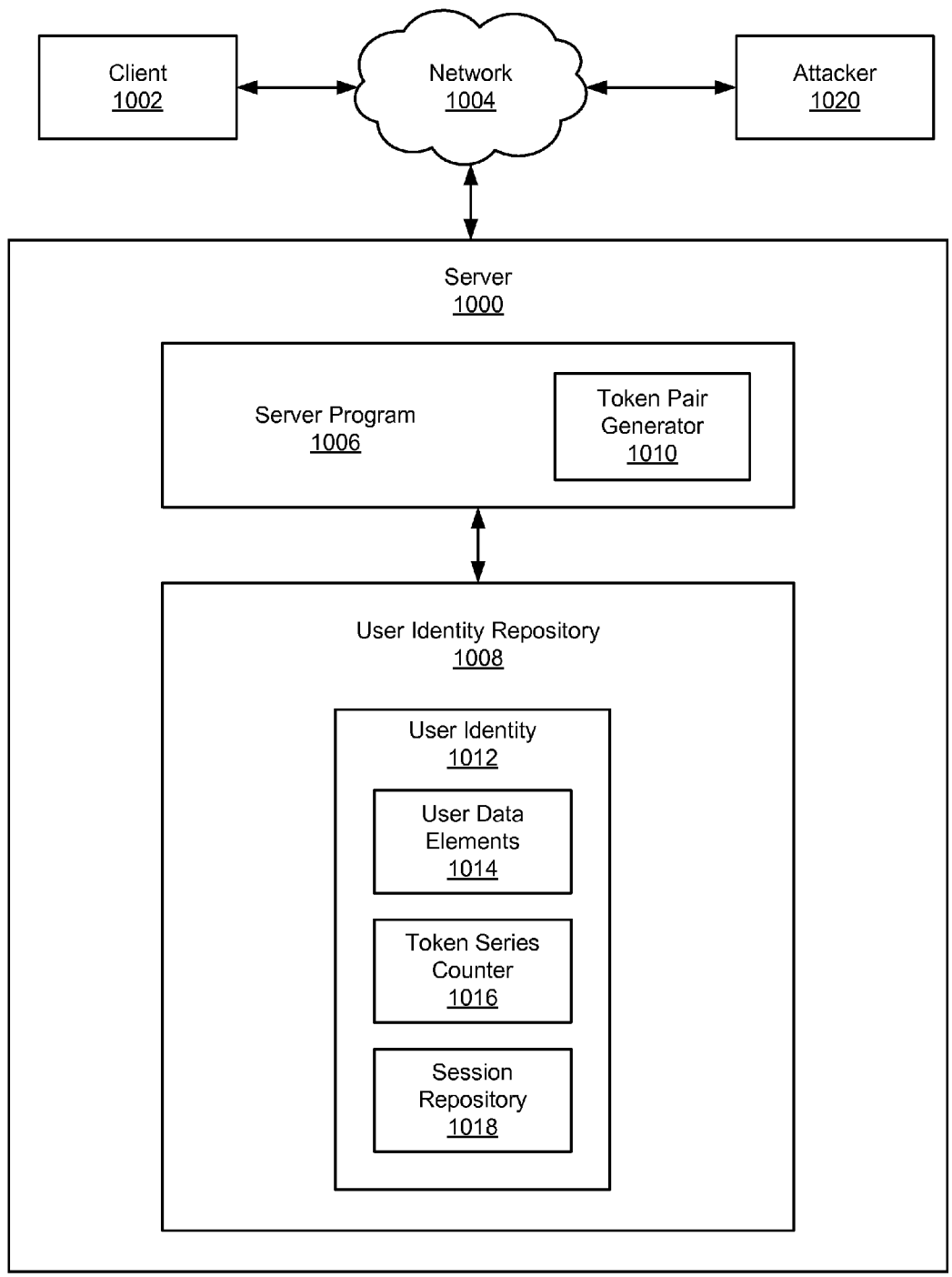
FIGS. 10A and 10B show an example in accordance with one or more embodiments of the invention.
Figure 10B:
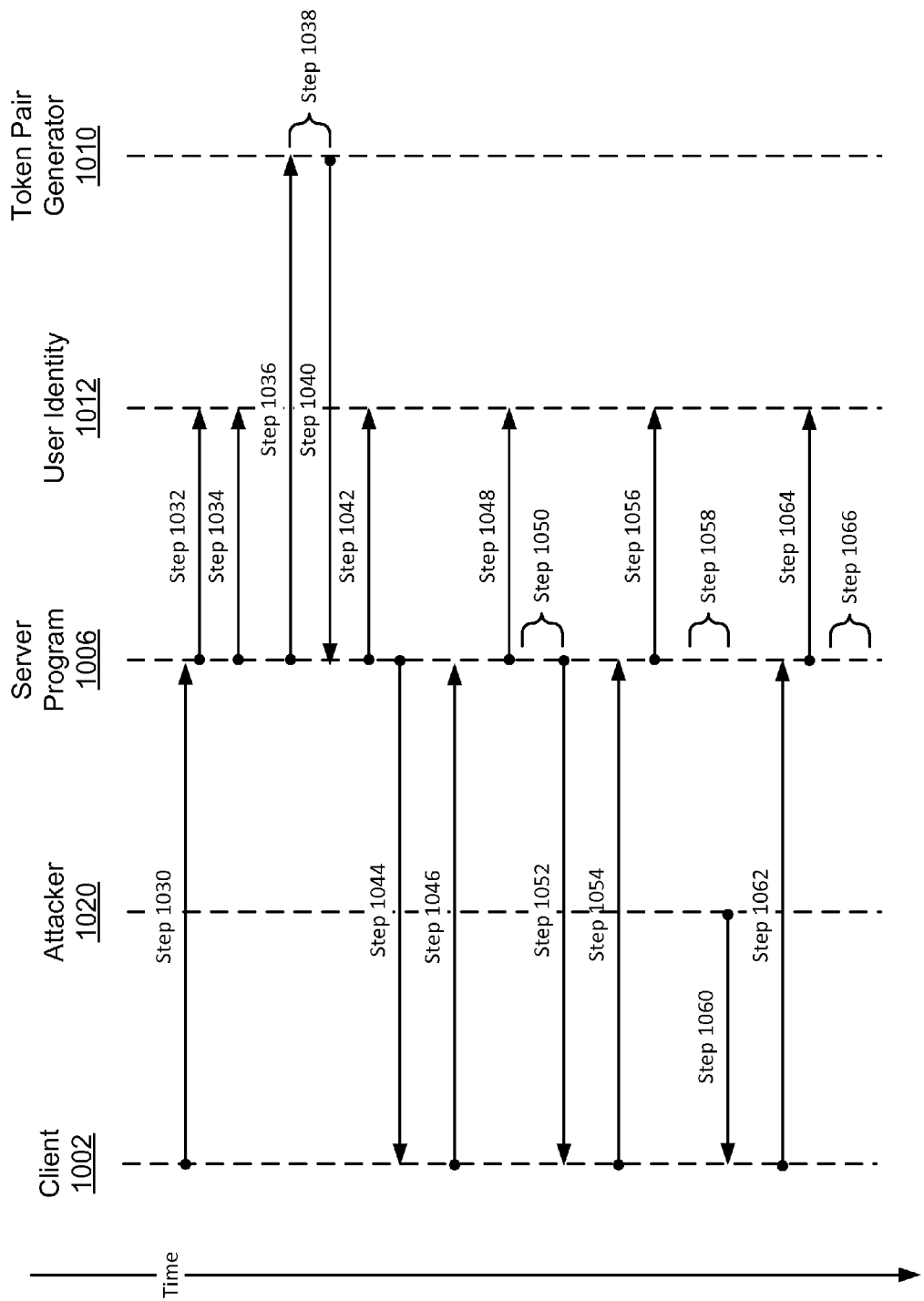
Figure 11:
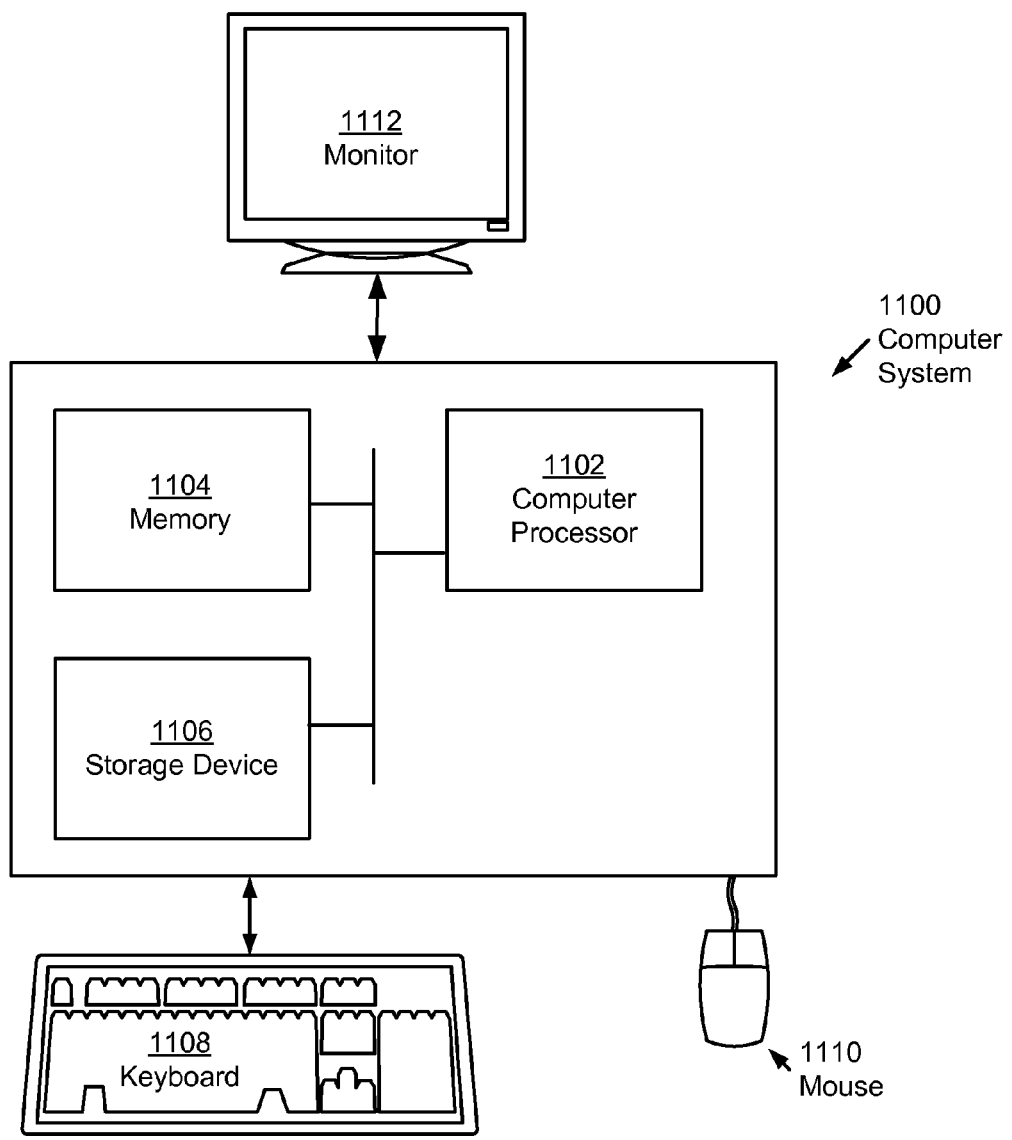
FIG. 11 shows a computer system in accordance with one or more embodiments of the invention.

FIGS. 10A and 10B show an example in accordance with one or more embodiments of the invention. As shown in FIG. 10A, the server (1000) includes a server program (1006) and a user identity repository (1008). The server program (1006) includes a token pair generator (1010). The user identity repository (1008) includes a single user identity (1012), and the user identity (1012) includes user data elements (1014), a token series counter (1016), and a session repository (1018). The server program is connected to a client (1002) and an attacker (1020) via a network (1004).

FIG. 10B shows an example timeline in accordance with one or more embodiments of the invention. In one or more embodiments, the timeline shown in FIG. 10B uses the components shown and described in relation to FIG. 10A and described below.

In Step 1030, the client (1002) establishes a session with the server program (1006) and requests a form page. In one embodiment of the invention, the request includes a session ID. In Step 1032, the server program (1006) accesses the user identity associated with the session identified by the session ID. Also, at Step 1032, the server program (1006) obtains the user data elements (1014) from the user identity (1012). At Step 1034, the server program (1006) obtains the current value for the token series counter (1016). For the purposes of the example, assume that the current value stored in the token series counter (1016) is "4321".

In Step 1036, the server program (1036) submits the user data elements and the token series counter value to the token pair generator (1010). In Step 1038, the token pair generator (1010) generates a primary and a secondary token using the user data elements and the token series counter value. For the purposes of the example, assume that the primary token includes the following: user data equal to a user ID as user0099, the series number equal to "4321", an expiration time of 2012:09:15:05:16:00, a plaintext data type equal to [date_user_created][userID], a plaintext equal to [2011:02:22:06:28:00][user0099], a plaintext hash, and a secondary token hash. Assume further that the secondary token includes the following: user data equal to a user ID as user0099, the series number equal to "4321", an expiration time of 2012:09:15:05:16:00, a plaintext data type equal to [userID][user_relm], a plaintext equal to [user0099][Mr_Smith], a plaintext hash, and a primary token hash.

In Step 1040, the server program (1006) obtains the generated primary token and secondary token from the token pair generator (1010). In Step 1042, the server program (1006) stores the secondary token in the current session associated with the request. In Step 1044, the server program (1006) places the primary token into the requested form and transmits the form to the client (1002). Assume for the purposes of the example, that the primary token is embedded in the form as an HTTP cookie and is HTTPS only.

In Step 1046, the server program (1006) receives a request from the client (1002) for the secondary token. For the purposes of the example, assume that the request is an AJAX call sent from the client in response to client loading the requested form. In one embodiment of the invention, the request is generated and sent by the client as part of the client program loading and/or executing the page form. In other words, the client program loads the page form for presentation to a user, and as part of the loading process, code within the page form generates the request (e.g., AJAX call) and sends the request to the server program. In one embodiment of the invention, the second request includes the primary token.

In Step 1048, the server program (1006) accesses the session associated with the request and obtains the secondary token. In Step 1050, the server program (1006) validates the primary token using the secondary token. For the purposes of the example, assume that the server program (1006) validates the primary token using the steps outlined in FIG. 9. Specifically, the server program (1006) first applies a hash function to the primary token and compares the result to the primary token hash stored in the secondary token. If the result is not consistent with the primary token hash stored in the secondary token, the token pair is rejected and an error is sent to the client. Assume that the results of the hash function match the primary token hash stored in the secondary token.

Next, the server program (1006) applies a plaintext hash to the plaintext in the primary token and compares the results to the plaintext hash stored in the primary token. Assume that the results of the hash function match the plaintext hash stored in the primary token. Next, the server program (1006) compares the expiration time of 2012:09:15:05:16:00 to the current system time. Assume that the current system time is before the expiration time.

Next, the server program (1006) obtains the series number of "4321" from the primary token and compare it to the value of the token series counter for the user identity. Assume that the value of the token series counter is "4321", and therefore the series number matches the stored value. Finally the server program (1006) uses the plaintext data type in the primary token to generate plaintext using the user data elements in the user identity. Therefore, in this example, the server program (1006) generates plaintext as [2011:02:22:06:28:00][user0099], which matches the plaintext stored in the primary token. At this point, the server program (1006) has validated the primary token. In Step 1052, the server program server program (1006) sends the token pair to the client in response to determining that the primary token is valid.

In Step 1054, the client transmits the populated form (which contains sensitive data or instructions) to the server program (1006). In Step 1056, the server program (1006) prepares to validate the token pair by accessing the user identity associated with the session and obtaining the user data elements and token series counter value.

In Step 1058, the server program (1006) validates the token pair. Assume that the primary token is validated in the same manner as the primary token validation performed at Step 1050. Assume further that the primary token has been found valid. The server program (1006) then proceeds to validate the secondary token. For the purposes of the example, assume that the server program (1006) validates the secondary token using the steps outlined in FIG. 9. Specifically, the server program (1006) first applies a hash function to the secondary token and compares the result to the secondary token hash stored in the primary token. If the result is not consistent with the secondary token hash stored in the primary token, the token pair is rejected and an error is sent to the client. Assume that the results of the hash function match the secondary token hash stored in the primary token.

Next, the server program (1006) applies a plaintext hash to the plaintext in the secondary token and compares the results to the plaintext hash stored in the secondary token. Assume that the results of the hash function match the plaintext hash stored in the secondary token. Next, the server program (1006) compares the expiration time of 2012:09:15:05:16:00 to the current system time. Assume that the current system time is before the expiration time.

Next, the server program (1006) obtains the series number of "4321" from the secondary token and compare it to the value of the token series counter for the user identity. Assume that the value of the token series counter is "4321", and therefore the series number matches the stored value. Finally the server program (1006) uses the plaintext data type in the secondary token to generate plaintext using the user data elements in the user identity. Therefore, in this example, the server program (1006) generates plaintext as [user0099][Mr_Smith], which matches the plaintext stored in the secondary token. At this point, the server program (1006) has validated the secondary token. Once both tokens have been validated, then the server program (1006) accepts the form, which may include executing instructions contained therein. Also at Step 1056, the server program (1006) increments the token series counter (1018) from "4321" to "4322".

Steps 1060 through 1066 show an example of a failed attempt to submit a form with a forged token. At Step 1060, the attacker (1020) coaxes the client (1002) into downloading the form from the attacker (1020). In one embodiment of the invention, this may be done by presenting a user of the client (1002) with a hyperlink that triggers the form download making it appear as though the form originated from the server program (1006). Assume that the form contains instructions to transfer money from the client (1002) to the attacker (1020). Further, assume that the attacker somehow obtained a previously used token pair, and copied the content of the token pair to generate the forged token pair.

In Step 1062, the form is submitted by the client (1002) and the server program (1006) receives the form containing a forged token pair from the client (1002). In Step 1064, the server program (1006) prepares to validate the forged token pair by accessing the user identity associated with the session and obtaining the user data elements and token series counter value.

In Step 1066, the server program (1006) attempts to validate the token pair. In this example, the server program (1006) determines that the series number of the submitted tokens ("4321") is younger than the current series number ("4322"). Accordingly, the submitted form is rejected. The attempt by the attacker (1020) to transfer funds from the client (1002) is, therefore, unsuccessful.

Embodiments of the invention may be implemented on virtually any type of computer regardless of the platform being used. For example, as shown in FIG. 13, a computer system (1100) includes one or more computer processor(s) (1102) such as a central processing unit (CPU) or other hardware processor(s), associated memory (1104) (e.g., random access memory (RAM), cache memory, flash memory, etc.), a storage device (1106) (e.g., a hard disk, an optical drive such as a compact disk drive or digital video disk (DVD) drive, a flash memory stick, etc.), and numerous other elements and functionalities typical of today's computers (not shown). In one or more embodiments of the invention, the processor (1102) is hardware. For example, the processor may be an integrated circuit. The computer system (1100) may also include input means, such as a keyboard (1108), a mouse (1110), or a microphone (not shown). Further, the computer system (1100) may include output means, such as a monitor (1112) (e.g., a liquid crystal display (LCD), a plasma display, or cathode ray tube (CRT) monitor). The computer system (1100) may be connected to a network (1114) (e.g., a local area network (LAN), a wide area network (WAN) such as the Internet, or any other type of network) via a network interface connection (not shown). Those skilled in the art will appreciate that many different types of computer systems exist, and the aforementioned input and output means may take other forms. Generally speaking, the computer system (1100) includes at least the minimal processing, input, and/or output means necessary to practice embodiments of the invention.

Further, those skilled in the art will appreciate that one or more elements of the aforementioned computer system (1100) may be located at a remote location and connected to the other elements over a network. Further, embodiments of the invention may be implemented on a distributed system having a plurality of nodes, where each portion of the invention (e.g., user agreement information, product use agreement pre-recordings, application store, product use agreement application, etc.) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a non-transitory computer readable storage medium, such as a compact disc (CD), a diskette, a tape, a memory, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for validating a form comprising:
providing, to a client device, the form comprising a primary token, wherein the primary token comprises plaintext and a first plaintext hash;
receiving, by a hardware processor and in response to the client loading the form, a request for a secondary token;
providing, by the hardware processor, the secondary token in response to receiving the request;
receiving the form comprising the primary token and the secondary token from a client;
validating the form, wherein validating the form comprises:
obtaining a first primary token hash from the secondary token,
applying a first hash function to the primary token to obtain a second primary token hash,
determining that the first primary token hash and the second primary token hash match;
applying a second hash function to the plaintext to obtain a second plaintext hash, and
determining that the first plaintext hash and the second plaintext hash match; and
accepting the form upon validating the form.

2. The method of claim 1, wherein the plaintext comprises unencrypted data associated with a user of the client.

3. The method of claim 1, wherein the primary token comprises first plaintext, and wherein validating the form further comprises:
obtaining user data elements from a user identity; and
determining that the user data elements and the first plaintext match.

4. The method of claim 3, wherein the secondary token comprises second plaintext, and wherein the first plaintext is different from the second plaintext.

5. The method of claim 1, wherein the primary token comprises an expiration time, and wherein validating the form further comprises:
determining that the current time is before the expiration time.

6. The method of claim 1, wherein the primary token comprises a series number, and wherein validating the form further comprises:
obtaining a token series counter value from a user identity; and
determining that the series number matches the token series counter value.

7. The method of claim 1, wherein determining that the form is valid further comprises:
obtaining a first secondary token hash from the primary token;
applying the first hash function to the secondary token to obtain a second secondary token hash; and
determining that the first secondary token hash and the second secondary token hash match.

8. The method of claim 1, wherein the first hash function is applied to a portion of the primary token.

9. A system comprising:
a computer processor and memory; and
a server program stored in the memory and executing on the computer processor with functionality to:
provide, to a client a form comprising a primary token, wherein the primary token comprises plaintext and a first plaintext hash;
receive, in response to the client loading the form, a request for a secondary token;
provide the secondary token in response to receiving the request;
receive the form comprising the primary token and the secondary token from a client;
validate the form, wherein the form is validated by:
obtaining a first primary token hash from the secondary token;
applying a first hash function to the primary token to obtain a second primary token hash;
determining that the first hash function and the second hash function match;
applying a second hash function to the plaintext to obtain a second plaintext hash; and
determining that the first plaintext hash and the second plaintext hash match; and
accept the form upon determining the form is validated.

10. The system of claim 9, further comprising:
a user identity comprising:
a token series counter value,
wherein the server program comprises further functionality to:
obtain the token series counter value from the user identity; and
determine that the series number matches the token series counter value.

11. The system of claim 9, wherein the plaintext comprises unencrypted data associated with a user of the client.

12. The system of claim 9, wherein the primary token comprises first plaintext, and wherein the server program comprises further functionality to:
obtain user data elements from the user identity; and
determine that the user data elements and the first plaintext match.

13. The system of claim 12, wherein the secondary token comprises second plaintext, and wherein the first plaintext is different from the second plaintext.

14. The system of claim 9, wherein the primary token comprises an expiration time, and wherein the server program comprises further functionality to:
determine that the current time is before the expiration time.

15. The system of claim 9, wherein the server program comprises further functionality to:
obtain a first secondary token hash from the primary token;
apply the first hash function to the secondary token to obtain a second secondary token hash; and
determine that the first secondary token hash and the second secondary token hash match.

16. The system of claim 9, wherein the first hash function is applied to a portion of the primary token.

17. A computer readable storage medium comprising instructions that, when executed by a processor, comprise functionality to perform the steps of:
providing, to a client a form comprising a primary token, wherein the primary token comprises plaintext and a first plaintext hash;
receiving, in response to the client loading the form, a request for a secondary token;
providing the secondary token in response to receiving the request;
receiving the form comprising the primary token and the secondary token from a client;
validating the form, wherein validating the form comprises:
obtaining a first primary token hash from the secondary token;
applying a first hash function to the primary token to obtain a second primary token hash;
determining that the first primary token hash and the second primary token hash match;
applying a second hash function to the plaintext to obtain a second plaintext hash; and
determining that the first plaintext hash and the second plaintext hash match; and
accepting the form upon validating the form.

18. The computer readable memory of claim 17, wherein the primary token comprises a series number, and wherein validating the form further comprises:
obtaining a token series counter value from a user identity; and
determining that the series number matches the token series counter value.

* * * * *